(12) United States Patent
Ojeda et al.

(10) Patent No.: US 6,954,329 B1
(45) Date of Patent: Oct. 11, 2005

(54) DISK DRIVE HAVING AN ACOUSTIC DAMPING ASSEMBLY WITH AN ACOUSTIC BARRIER LAYER

(75) Inventors: Valentin Ojeda, Watsonville, CA (US); David Ali, San Jose, CA (US); Keith R. Berding, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 109 days.

(21) Appl. No.: 10/448,487

(22) Filed: May 30, 2003

(51) Int. Cl.[7] ............................................. G11B 33/08
(52) U.S. Cl. .................................. 360/97.02; 720/651
(58) Field of Search ................................ 720/650, 651; 360/97.01, 97.02, 97.03

(56) References Cited

U.S. PATENT DOCUMENTS

| | | | |
|---|---|---|---|
| 5,235,482 A | | 8/1993 | Schmitz |
| 5,483,397 A | * | 1/1996 | Gifford et al. ............ 360/97.01 |
| 5,666,239 A | * | 9/1997 | Pottebaum ............... 360/97.03 |
| 5,757,580 A | * | 5/1998 | Andress et al. .......... 360/97.02 |
| 6,078,498 A | * | 6/2000 | Eckerd et al. ............... 361/685 |
| 6,177,173 B1 | * | 1/2001 | Nelson ........................ 428/137 |
| 6,288,866 B1 | * | 9/2001 | Butler et al. ............. 360/97.01 |
| 6,411,463 B1 | * | 6/2002 | Janik et al. .............. 360/97.01 |
| 6,469,864 B2 | * | 10/2002 | Kamezawa et al. ...... 360/97.01 |
| 6,498,700 B2 | * | 12/2002 | Takahashi et al. ........ 360/97.01 |
| 6,674,608 B1 | * | 1/2004 | Bernett .................... 360/97.01 |
| 6,697,217 B1 | * | 2/2004 | Codilian .................. 360/97.01 |
| 6,735,043 B2 | * | 5/2004 | Bernett et al. ........... 360/97.01 |
| 2002/0141108 A1 | * | 10/2002 | Daniel et al. ............ 360/97.01 |

FOREIGN PATENT DOCUMENTS

WO   WO 2002/071417 A   *   9/2002   ........... G11B 33/08

* cited by examiner

Primary Examiner—William J. Klimowicz
(74) Attorney, Agent, or Firm—Ramin Mobarhan, Esq.

(57) ABSTRACT

A disk drive that includes a head disk assembly (HDA) having a disk drive base, and a printed circuit board assembly (PCBA) in communication with the HDA. The invention further includes an acoustic damping assembly placed between the disk drive base and the PCBA. The acoustic damping assembly includes first and second acoustic absorption layers having major surfaces, an acoustic barrier layer placed in between the major surfaces, and the major surfaces and the acoustic barrier layer are fixed in a stacked relationship.

34 Claims, 4 Drawing Sheets

DISK DRIVE HAVING AN ACOUSTIC DAMPING ASSEMBLY WITH AN ACOUSTIC BARRIER LAYER

FIELD OF THE INVENTION

The present invention relates to disk drives. More particularly, this invention pertains to a disk drive including an acoustic damping assembly for damping of noise generated by the operation of the disk drive.

BACKGROUND OF THE INVENTION

Disk drives are commonly employed in workstations, personal computers, portables and other computer systems to store large amounts of data in a readily-available form. Typically, the primary components of a disk drive are a head disk assembly and a printed circuit board assembly which when fixed to one another form a functional unit that is then connected to a computer, such as by insertion into a bay of a host computer.

The head disk assembly includes a base and a cover which collectively house a head stack assembly and a data storage disk mounted on a spindle motor assembly for rotating said storage disk, and an actuator arrangement, driven by a voice coil motor, for advancing a read/write head. A flex circuit transmits data signals to and from the read/write head of the actuator.

The operation of a hard disk drive necessarily generates noise such as airborne and structure borne noises. For example, the electromagnetic spindle and the electro-mechanical voice coil motors drive the device with the spindle motor continually rotating the storage disk(s), and the voice coil motor selectively driving the actuator(s) to position the read/write heads. The motors transmit structural vibrations throughout the disk drive, for example the cover and the printed circuit board, creating audible noise of varying frequencies.

The presence of acoustic noise in an operating disk drive is undesirable. Users perceive loudness as an indication of lower quality. As such, acoustic characteristics may serve as a benchmark of product quality. Furthermore, the ever-increasing operational speed of computers mandates reductions in the data access time from disk drives, resulting in increases in the speed of spindle motor and the actuator which in turn intensifies the overall disk drive noise. In addition, disk drive customers present increasingly challenging acoustic requirements, forcing manufacturers to design disk drives characterized by reduced acoustic noise.

Currently, one form of reducing the noise associated with the operation of a disk drive is by use of damping materials. Typically, a layer of damping material, such as a foam material, is located in various regions of the disk drive, such as in between the printed circuit board and the head disk assembly to reduce the associated amplification of the noise by the printed circuit board. One example of the damping material is a layer of adhesive material inserted between the base assembly (of the head disk assembly) and the circuit board, as described in the U.S. Pat. No. 5,235,482 entitled "Magnetic disk drive incorporating a mechanically damped base", herein incorporated by reference. Although increasing the thickness of damping material could improve acoustic damping, disk drive form factor standards limit the thickness of damping materials which can be used.

Accordingly, what is needed is a noise-damping device that allows for dampening the noise generated by the operation of the disk drive while minimizing the need for increased thickness of the noise-damping device.

SUMMARY OF THE INVENTION

This invention can be regarded as a disk drive that includes a head disk assembly (HDA) comprising a disk drive base, and a printed circuit board assembly (PCBA) in communication with the HDA. The invention further includes an acoustic damping assembly placed between the disk drive base and the PCBA. The acoustic damping assembly includes first and second acoustic absorption layers having major surfaces, an acoustic barrier layer placed in between the major surfaces, and means for fixing the major surfaces and the acoustic barrier layer in a stacked relationship.

This invention can also be regarded as a disk drive that includes a head disk assembly (HDA) comprising a disk drive base, and a printed circuit board assembly (PCBA) in communication with the HDA. The invention further includes an acoustic damping assembly placed between the disk drive base and the PCBA. The acoustic damping assembly includes a compressible acoustic absorption layer having a major surface wherein the compressible acoustic absorption layer is characterized by an unconstrained thickness d1. The acoustic damping assembly further includes an acoustic barrier layer placed in between the major surfaces, and means for fixing the major surface and the acoustic barrier layer in a stacked relationship. The invention further includes means for securing the acoustic damping assembly in between the disk drive base and the PCBA such that the compressible acoustic absorption layer is compressed to a thickness of less than d1.

DETAILED DESCRIPTION OF THE INVENTION

Figure 1:
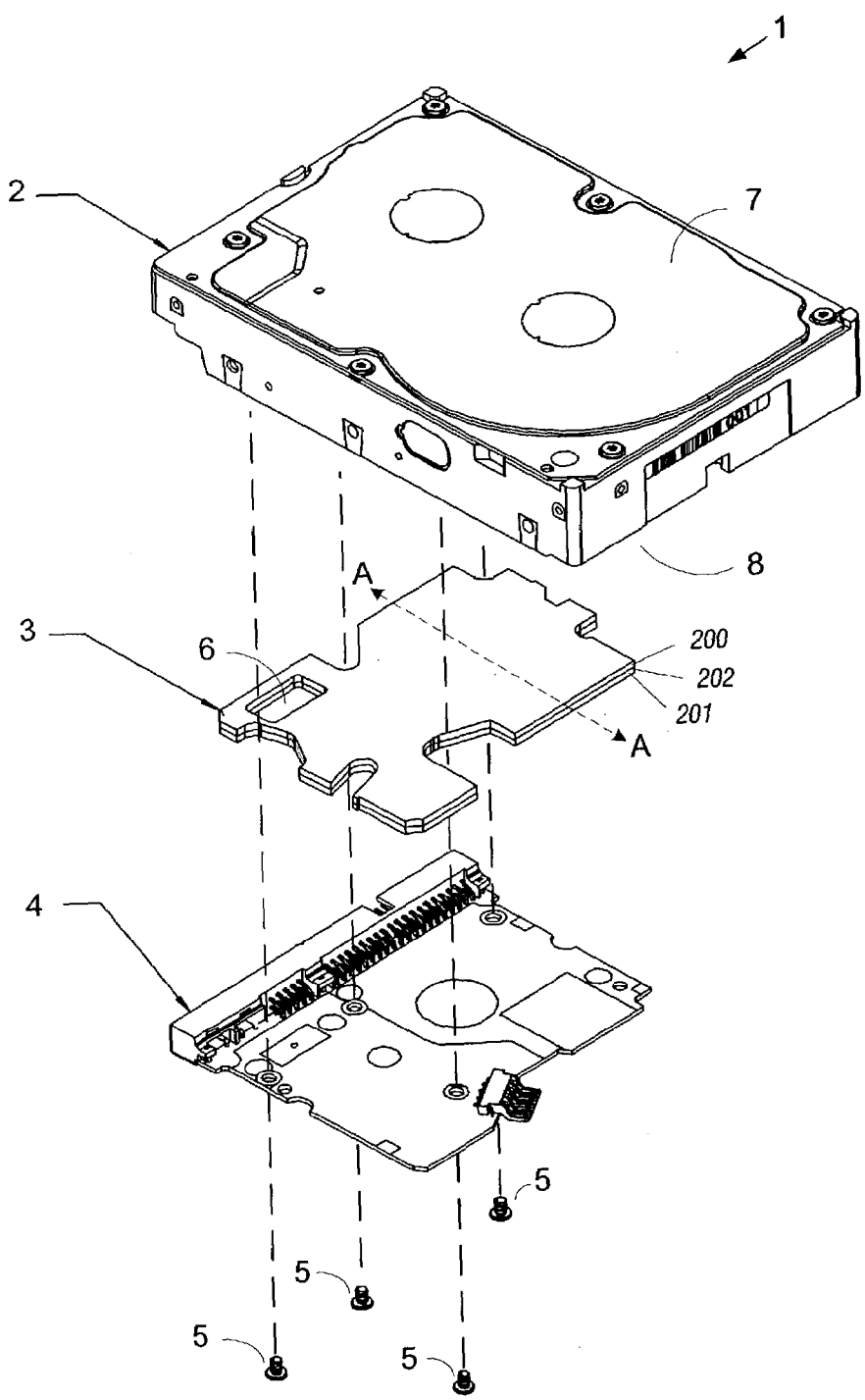
FIG. 1 is an exploded perspective view of a disk drive including a head disk assembly, a printed circuit board assembly, and an embodiment of an acoustic damping assembly of the present invention.

With reference to FIG. 1, a disk drive 1 according to an embodiment of the present invention includes a head disk assembly (HDA) 2 that is in communication with a printed circuit board assembly (PCBA) 4. The HDA 2 includes a disk drive cover assembly 7 and a disk drive base 8 collectively housing a head stack assembly (not shown), and data storage disks mounted on a spindle motor assembly for rotating the storage disks (not shown).

The disk drive 1 further includes an acoustic damping assembly 3 placed between the disk drive base 8 and the PCBA 4. The acoustic damping assembly 3 includes first and second acoustic absorption layers 200 and 201, respectively. The absorption layers 200 and 201 have major surfaces 200a and 201a (shown in FIG. 2A) in between which an acoustic barrier layer 202 is placed. The acoustic barrier layer 202 is of a denser composition than each of the first and second acoustic absorption layers 200 and 201 as described in greater detail in conjunction with FIG. 2A. Suitably, each of the major surfaces 200a and 201a and the acoustic barrier layer 202 are co-extensive with one another. The acoustic damping assembly 3 further includes means, such as adhesive, for fixing the major surfaces 200a and 201a and the acoustic barrier layer 3 in a stacked relationship as shown in FIG. 1. The acoustic damping assembly 3 further includes a clearance opening 6 adapted to allow passage of a connector cable (not shown) connecting the HDA 2 to the PCBA 4. Suitably, the acoustic damping assembly 3 substantially covers the PCBA 4.

Figure 2A:
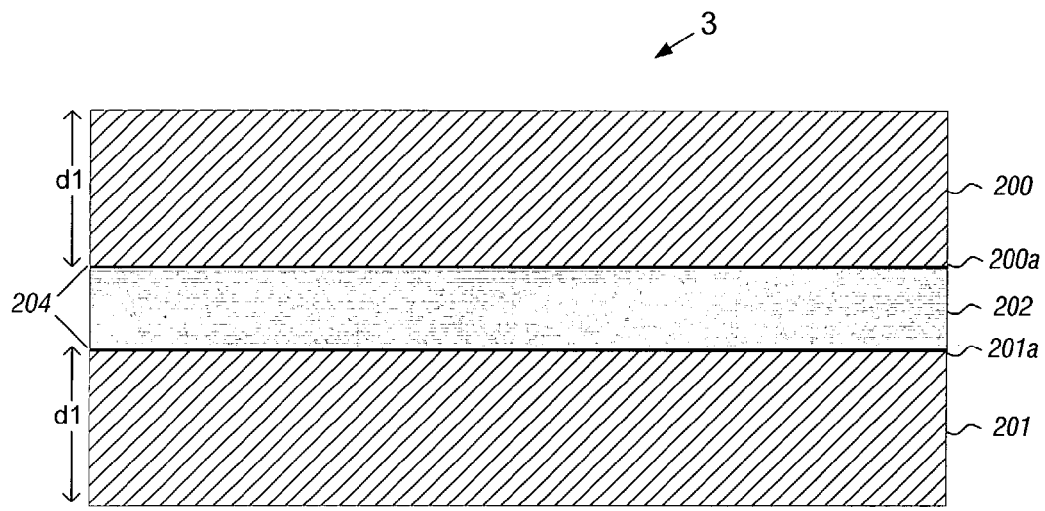
FIGS. 2A–B are cross-sectional views of one embodiment of the acoustic damping assembly of the present invention.

With reference to FIG. 2A, a cross-sectional view of the acoustic damping assembly 3, such as one taken at line A—A of FIG. 1 is shown. As shown in FIG. 2A, the acoustic damping assembly 3 includes the acoustic barrier layer 202 placed in between the absorption layers 200 and 201. The acoustic barrier layer 202 is of a denser composition than each of acoustic absorption layers 200 and 201. Suitably, the acoustic barrier layer 202 is of a consistent density and the acoustic absorption layers 200 and 201 are each of a substantially inconsistent density. In one embodiment of the present invention, the acoustic barrier layer 202 is of a metallic composition, such as stainless steel or an aluminum alloy. In another embodiment, the acoustic barrier layer 202 may be a plastic film, such as a polyester composition, an example of which is Mylar™. Suitably, the acoustic barrier layer 202 is characterized by a thickness of approximately 0.010 inches. In one embodiment of the present invention, the absorption layers 200 and 201 are each characterized by an unconstrained thickness d1, such as approximately 0.079 inches and may be suitably fabricated of a compressible foam composition such as of polyvinyl chloride foam composition, a polyethylene foam composition, a polyurethane foam or other foam materials providing comparable acoustic absorption benefits. Suitably, the absorption layers 200 and 201 are also fabricated of a composition of an open cell type, closed cell type, semi-open cell type or semi-closed cell type.

As further shown in FIG. 2A, the absorption layers 200 and 201 have major surfaces 200a and 200b, respectively, in between which the acoustic barrier layer 202 is placed. Suitably, each of the major surfaces 200a and 201a and the acoustic barrier layer 202 are co-extensive with one another. The acoustic damping assembly 3 further includes means 204, for fixing the major surfaces 200a and 201a and the acoustic barrier layer 3 in a stacked relationship. Suitably, the means 204 includes an adhesive, such as glue, applied to substantially cover the major surfaces 200a and 201a.

Figure 2B:
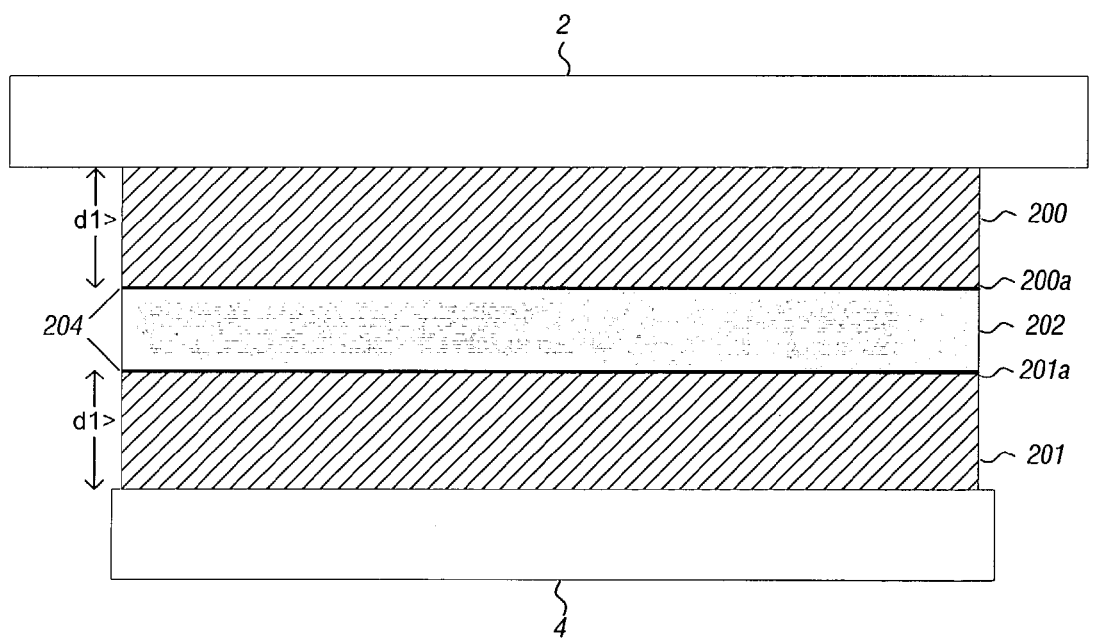

With reference to FIG. 2B, a cross-sectional view of an acoustic damping assembly 3, such as one taken at line A—A of FIG. 1 is shown, in which the disk drive 1 has been assembled by fixing the HDA 2, the PCBA 4 and the acoustic damping assembly 3 into a stacked relationship. Suitably, fixing means such as screws 5 (shown in FIG. 1) extending from the PCBA 4 and received in corresponding holes (not shown) in the HDA 2, are used to assemble disk drive 1. As shown in FIG. 2B, assembling disk drive 1 causes the compressible foam of the absorption layers 200 and 201 to be compressed to a thickness of less than d1, thus securing the acoustic damping assembly 3 in between the PCBA 4 and the HDA 2. Suitably, the compressed thickness is approximately 0.60(d1) for each of absorption layers 200 and 201. As shown, the acoustic damping assembly 3 substantially covers the PCBA 4.

One advantage of the foregoing feature of the present invention over the prior art is that by placing an acoustic barrier layer 202 in between the less dense acoustic absorption layers 200 and 201 in a stacked relationship, the transmission of noise generated by the operation of the disk drive 1 across the acoustic damping assembly 3 can be further dampened while minimizing the need for increased thickness of the acoustic damping assembly 3.

Figure 3A:
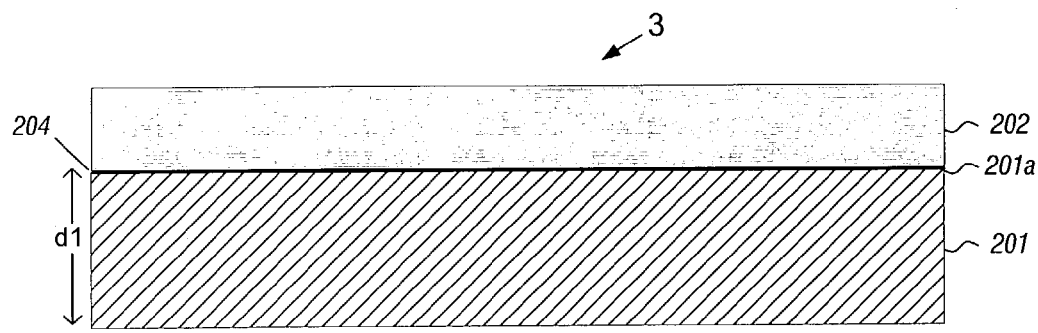
FIGS. 3A–D are cross-sectionals view of other embodiments of the acoustic damping assembly of the present invention.

With reference to FIG. 3A, a cross-sectional view of another embodiment of the acoustic damping assembly 3 is shown. As shown in FIG. 3A, the acoustic damping assembly 3 includes an acoustic barrier layer 202, and a compressible acoustic absorption layer 201 having a major surface 201a and characterized by an unconstrained thickness d1. The acoustic barrier layer 202 is of a denser composition than the acoustic absorption layers 201. Suitably, the acoustic barrier layer 202 is of a consistent density and the acoustic absorption layer 201 is of a substantially inconsistent density. In one embodiment of the present invention, the acoustic barrier layer 202 is of a metallic composition, such as stainless steel or an aluminum alloy. In another embodiment, the acoustic barrier layer 202 may be a plastic film, such as a polyester composition, an example of which is Mylar™. Suitably, the acoustic barrier layer 202 is characterized by a thickness of approximately 0.010 inches. In one embodiment of the present invention, the absorption layer 201 is characterized by an unconstrained thickness d1, such as approximately 0.15 inches and may be suitably fabricated of a compressible foam composition such as of polyvinyl chloride foam composition, a polyethylene foam composition, a polyurethane foam or other foam materials providing comparable acoustic absorption benefits. Suitably, the absorption layer 201 is also fabricated of a composition of an open cell type, closed cell type, semi-open cell type or semi-closed cell type. The acoustic damping assembly 3 further includes means 204, for fixing the major surfaces 201a and the acoustic barrier layer 3 in a stacked relationship as shown in FIG. 3A. Suitably, the means 204 includes an adhesive, such as glue, applied to substantially cover the major surfaces 201a.

Figure 3B:
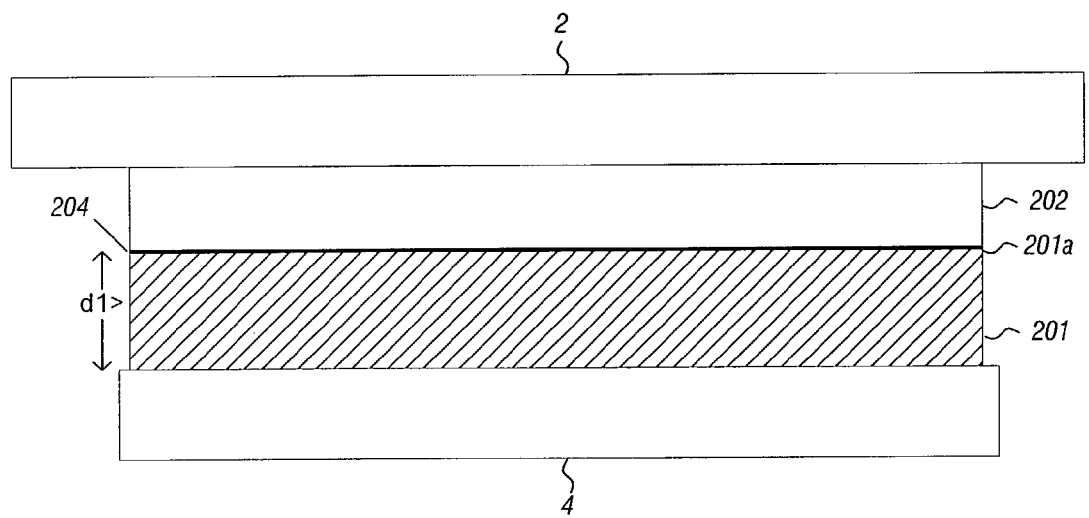

With reference to FIG. 3B, a cross-sectional view of an acoustic damping assembly 3 of FIG. 3A is shown, in which the disk drive 1 has been assembled by fixing the HDA 2, the PCBA 4 and the acoustic damping assembly 3 into a stacked relationship. Suitably, fixing means such as fastener screws 5 (shown in FIG. 1) extending from the PCBA 4 and received in corresponding holes (not shown) in the HDA 2, are used to assemble disk drive 1. As shown in FIG. 3B, assembling disk drive 1 causes the compressible acoustic absorption layer 201 to be compressed to a thickness of less than d1, thus securing the acoustic damping assembly 3 in between the PCBA 4 and the HDA 2. Suitably, the compressed thickness is approximately 0.60(d1) for the absorption layer 201. As shown, the acoustic damping assembly 3 substantially covers the PCBA 4.

Figure 3C:
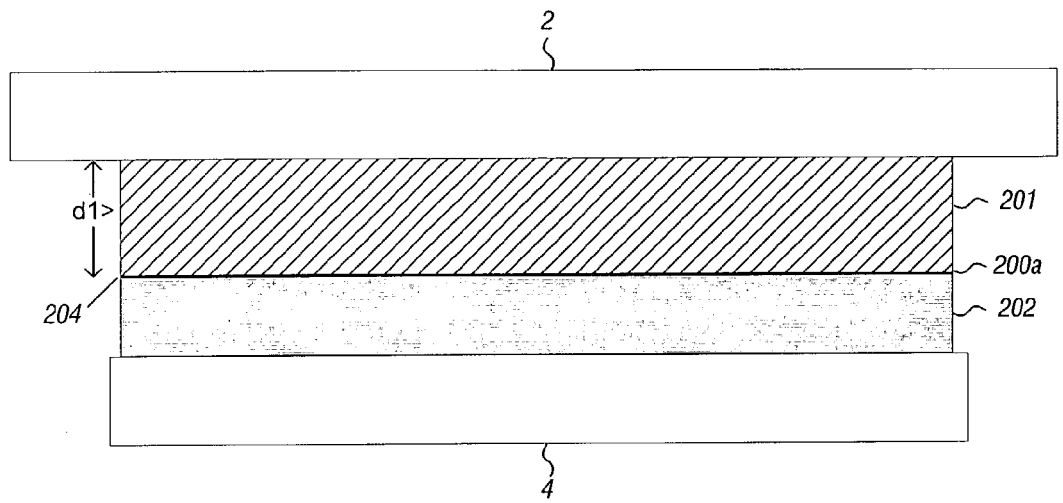

With reference to FIG. 3C, a cross-sectional view of an acoustic damping assembly 3 of FIG. 3A is shown in which the disk drive 1 has been assembled by fixing the HDA 2, the PCBA 4 and the acoustic damping assembly 3 into a stacked relationship. In this embodiment of the present invention, the acoustic barrier layer 202 is placed between the acoustic absorption layer 201 and the PCBA 4. Suitably, the acoustic barrier layer 202 is of a dielectric composition.

Figure 3D:
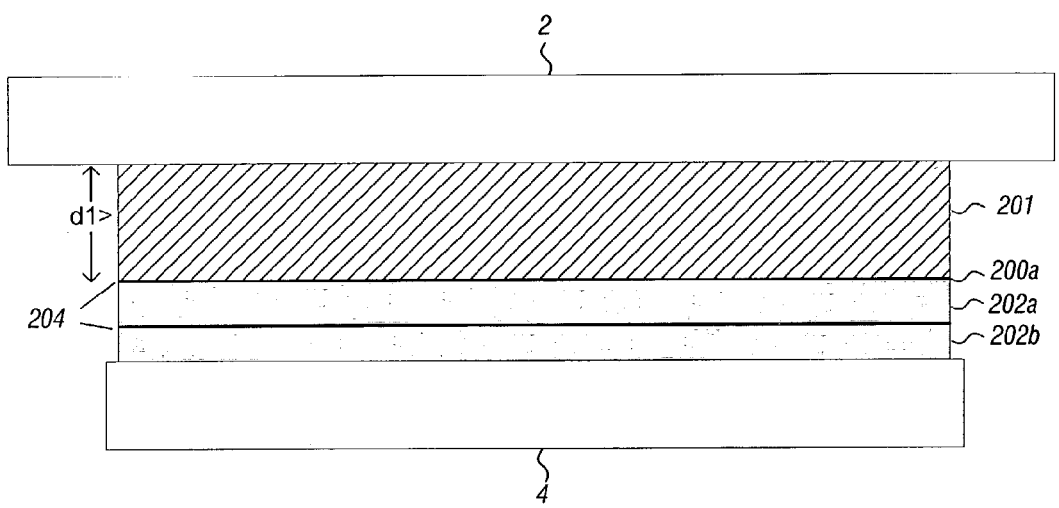

With reference to FIG. 3D, a cross-sectional view of an acoustic damping assembly 3 of FIG. 3C is shown in which the disk drive 1 has been assembled by fixing the HDA 2, the PCBA 4 and the acoustic damping assembly 3 into a stacked relationship. In this embodiment of the present invention, the acoustic barrier layer 202 includes a first barrier layer 202a placed in between the acoustic absorption layer 201 and a second barrier layer 202b. As shown, the second barrier layer 202b is placed in between the first barrier layer 202a and the PCBA 4. Suitably, the second barrier layer 202b is of a dielectric composition. Suitably, the acoustic damping assembly 3 includes means 204, for fixing the first and second barrier layers 202a and 202b in a stacked relationship as shown in FIG. 3D. Suitably, the means 204 includes an adhesive, such as glue, applied to the first and second barrier layers 202a and 202b.

One advantage of the foregoing features of the present invention (as shown in FIGS. 3A–D) over the prior art is that by placing an acoustic barrier layer 202 in a stacked relationship with the less dense acoustic absorption layer 201, the transmission of noise generated by the operation of the disk drive 1 across the acoustic damping assembly 3 can be further dampened while minimizing the need for increased thickness of the acoustic damping assembly 3.

What is claimed is:

1. A disk drive comprising:
   a) a head disk assembly (HDA) comprising a disk drive base;
   b) a printed circuit board assembly (PCBA) in communication with the HDA; and
   c) an acoustic damping assembly placed between the disk drive base and the PCBA, wherein the acoustic damping assembly comprises:
      first and second acoustic absorption layers having major surfaces wherein the first and second acoustic absorption layers comprise a foam composition;
      an acoustic barrier layer placed in between the major surfaces wherein the acoustic barrier layer is of a denser composition than each of the first and second acoustic absorption layers; and
      means for fixing the major surfaces and the acoustic barrier layer in a stacked relationship.

2. A disk drive as defined in claim 1, wherein the acoustic damping assembly substantially covers the PCBA.

3. A disk drive as defined in claim 1, wherein the acoustic barrier layer is of a consistent density and the acoustic absorption layers are each of a substantially inconsistent density.

4. A disk drive as defined in claim 1, wherein the acoustic barrier layer comprises a plastic film.

5. A disk drive as defined in claim 4, wherein the plastic film comprises a polyester composition.

6. A disk drive as defined in claim 1, wherein the acoustic barrier layer comprises a metallic composition.

7. A disk drive as defined in claim 6, wherein the metallic composition comprises at least one of a stainless steel and aluminum alloy.

8. A disk drive as defined in claim 1, wherein the acoustic barrier layer is characterized by a thickness of approximately 0.010 inches.

9. A disk drive as defined in claim 1, wherein the foam composition is a compressible foam.

10. A disk drive as defined in claim 9, wherein the compressible foam is characterized by an unconstrained thickness d1.

11. A disk drive as defined in claim 10, wherein the unconstrained thickness is approximately 0.079 inches.

12. A disk drive as defined in claim 10, wherein the compressible foam is compressed to a thickness less than d1.

13. A disk drive as defined in claim 12, wherein the compressed thickness is approximately 0.60(d1).

14. A disk drive as defined in claim 1, wherein each of the major surfaces and the acoustic barrier layer are coextensive with one another.

15. A disk drive as defined in claim 1, wherein the foam composition comprises at least one of an open cell type, a closed cell type, a semi-open cell type and a semi-closed cell type.

16. A disk drive as defined in claim 1, wherein the foam composition comprises at least one of a polyvinylchloride foam, a polyethylene foam and a polyurethane foam.

17. A disk drive as defined in claim 1, wherein the means for fixing the major surfaces and the acoustic barrier layer comprises an adhesive.

18. A disk drive as defined in claim 1, wherein the acoustic damping assembly comprises a clearance opening adapted to allow passage of a connector cable connecting the HDA to the PCBA.

19. A disk drive comprising:
   a) a head disk assembly (HDA) comprising a disk drive base;
   b) a printed circuit board assembly (PCBA) in communication with the HDA; and
   c) an acoustic damping assembly placed between the disk drive base and the PCBA, wherein the acoustic damping assembly comprises:
      a compressible acoustic absorption layer having a major surface wherein the compressible acoustic absorption layer is characterized by an unconstrained thickness d1;
      an acoustic barrier layer; and
      means for fixing the major surface and the acoustic barrier layer in a stacked relationship; and
   d) means for securing the acoustic damping assembly in between the disk drive base and the PCBA such that the compressible acoustic absorption layer is compressed to a thickness of less than d1.

20. A disk drive as defined in claim 19, wherein the acoustic damping assembly substantially covers the PCBA.

21. A disk drive as defined in claim 19, wherein the compressed thickness is approximately 0.60(d1).

22. A disk drive as defined in claim 19, wherein the acoustic barrier layer is of a denser composition than the acoustic absorption layer.

23. A disk drive as defined in claim 22, wherein the acoustic barrier layer is of a consistent density and the acoustic absorption layer is of a substantially inconsistent density.

24. A disk drive as defined in claim 23, wherein the acoustic barrier layer is placed between the acoustic absorption layer and the PCBA.

25. A disk drive as defined in claim 24, wherein the acoustic barrier layer comprises:
   a first barrier layer placed in between the acoustic absorption layer and a second barrier layer, wherein the second barrier layer is placed in between the first barrier layer and the PCBA; and
   means for fixing the first and second barrier layers in a stacked relationship.

26. A disk drive as defined in claim 25, wherein the second barrier layer comprises a dielectric composition.

27. A disk drive as defined in claim 23, wherein the acoustic barrier layer is placed between the acoustic absorption layer and the disk drive base.

28. A disk drive as defined in claim 19, wherein the compressible acoustic absorption layer comprise a compressible foam composition.

29. A disk drive as defined in claim 28 wherein the foam composition comprises at least one of an open cell type, a closed cell type, a semi-open cell type and a semi-closed cell type.

30. A disk drive as defined in claim 28, wherein the foam composition comprises at least one of a polyvinylchloride foam, a polyethylene foam and a polyurethane foam.

31. A disk drive as defined in claim 19, wherein the means for fixing the major surface and the acoustic barrier layer comprises an adhesive.

32. A disk drive as defined in claim 19, wherein the means for securing the acoustic damping assembly in between the disk drive base and the PCBA is at least one fastener fixing the PCBA to the disk drive base.

33. A disk drive as defined in claim 32, wherein the fastener is a screw.

34. A disk drive as defined in claim 19, wherein the unconstrained thickness is approximately 0.15 inches.

* * * * *